(12) United States Patent
Wang (10) Patent No.: US 8,055,798 B2
(45) Date of Patent: Nov. 8, 2011

(54) METHOD AND SYSTEM FOR TRANSMITTING SHARED CONTENTS AND CONTENT TERMINAL THEREOF

(75) Inventor: Tieying Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 12/430,611

(22) Filed: Apr. 27, 2009

(65) Prior Publication Data

US 2009/0204727 A1     Aug. 13, 2009

Related U.S. Application Data

(63) Continuation of application No. PCT/CN2007/070481, filed on Aug. 15, 2007.

(30) Foreign Application Priority Data

Oct. 30, 2006    (CN) .......................... 2006 1 0150366

(51) Int. Cl.
     *G06F 15/16*      (2006.01)

(52) U.S. Cl. ......... 709/246; 709/231; 709/232; 709/236

(58) Field of Classification Search .................. 709/246, 709/231, 232, 236
See application file for complete search history.

(56) References Cited

U.S. PATENT DOCUMENTS

| | | | |
|---|---|---|---|
| 2004/0236869 A1 | 11/2004 | Moon | |
| 2006/0159079 A1 | 7/2006 | Sachs et al. | |
| 2006/0224760 A1* | 10/2006 | Yu et al. | 709/231 |

FOREIGN PATENT DOCUMENTS

| | | |
|---|---|---|
| CN | 1550088 | 11/2004 |
| CN | 1745533 | 3/2006 |
| WO | WO-2005022813 | 3/2005 |

OTHER PUBLICATIONS

Wu, et al. "Echelon: Peer-to-Peer Network Diagnosis with Network Coding." Quality of Service, IWQOS 2006. 14th IEEE International Workshop. Jun. 1, 2006, pp. 20-29.*
Wu, C. et al. "Echelon: Peer-to-Peer Network Diagnosis with Network Coding." IEEE Workshop on Quality of Service, pp. 20-20 (2006).
Li, J. et al. "Erasure Resilient Codes in Peer-to-Peer Storage Cloud." Proceedings of the International Conference on Acoustics, Speech and Signal Processing, May 14-19, 2006. pp. 233-236.
Gkantsidis, C. et al. "Network Coding for Large Scale Content Distribution." 24th Annual Joint Conference of the IEEE Computer and Communication Societies. vol. 4, pp. 2235-2245 (2005).

* cited by examiner

*Primary Examiner* — Larry Donaghue
*Assistant Examiner* — Nicholas Taylor
(74) *Attorney, Agent, or Firm* — Staas & Halsey LLP (57) ABSTRACT

A method for transmitting shared contents includes: pre-configuring rules for constructing coefficient vectors corresponding to the shared content on each content terminal; by the content source peer, dividing the original content into blocks, constructing coefficient vectors corresponding to the original content according to the rules for constructing coefficient vectors, and combining each original content block with the corresponding coefficient vector linearly to obtain code blocks, with the ID of each code block same as the ID of the corresponding coefficient vector; and by the content receiving peer, downloading the code blocks from the content source peer according to the IDs of code blocks. A system for transmitting shared contents includes: a content source peer and a content receiving peer. The present invention also discloses a content terminal. The present invention may save the transmission bandwidth and improve the content sharing efficiency.

14 Claims, 7 Drawing Sheets

METHOD AND SYSTEM FOR TRANSMITTING SHARED CONTENTS AND CONTENT TERMINAL THEREOF

CROSS-REFERENCE TO RELATED APPLICATIONS

This application is a continuation of International Application No. PCT/CN2007/070481, filed on Aug. 15, 2007, which claims the benefit of Chinese Patent Application No. 200610150366.2, filed on Oct. 30, 2006, both of which are hereby incorporated by reference in their entireties.

FIELD OF THE INVENTION

The present invention relates to content sharing technologies, and in particular, to a method and system for transmitting shared contents and a content terminal thereof.

BACKGROUND OF THE INVENTION

The peer-to-peer (P2P) network technology, as the technical drive for next generation services, is expected to improve the technical performance of P2P applications under limited hardware resources while developing new services. During the content sharing, some large shared contents are divided into blocks to ensure the content sharing efficiency and utilize the terminal performance. In this way, a terminal may obtain content blocks according to the actual requirements. The content may be divided into blocks by size or by the time when the content is transmitted. The latter method is widely applied in the content division of streaming media.

When the content source peer transfers a content block to the content receiving peer, the meta information of the content block is also transferred to the content receiving peer. The Meta information may include the location where the content block is located in the whole content. Upon receipt of enough content blocks, the content receiving peer may arrange the content blocks according to the location information of each content block so as to recover the original content.

Figure 1:
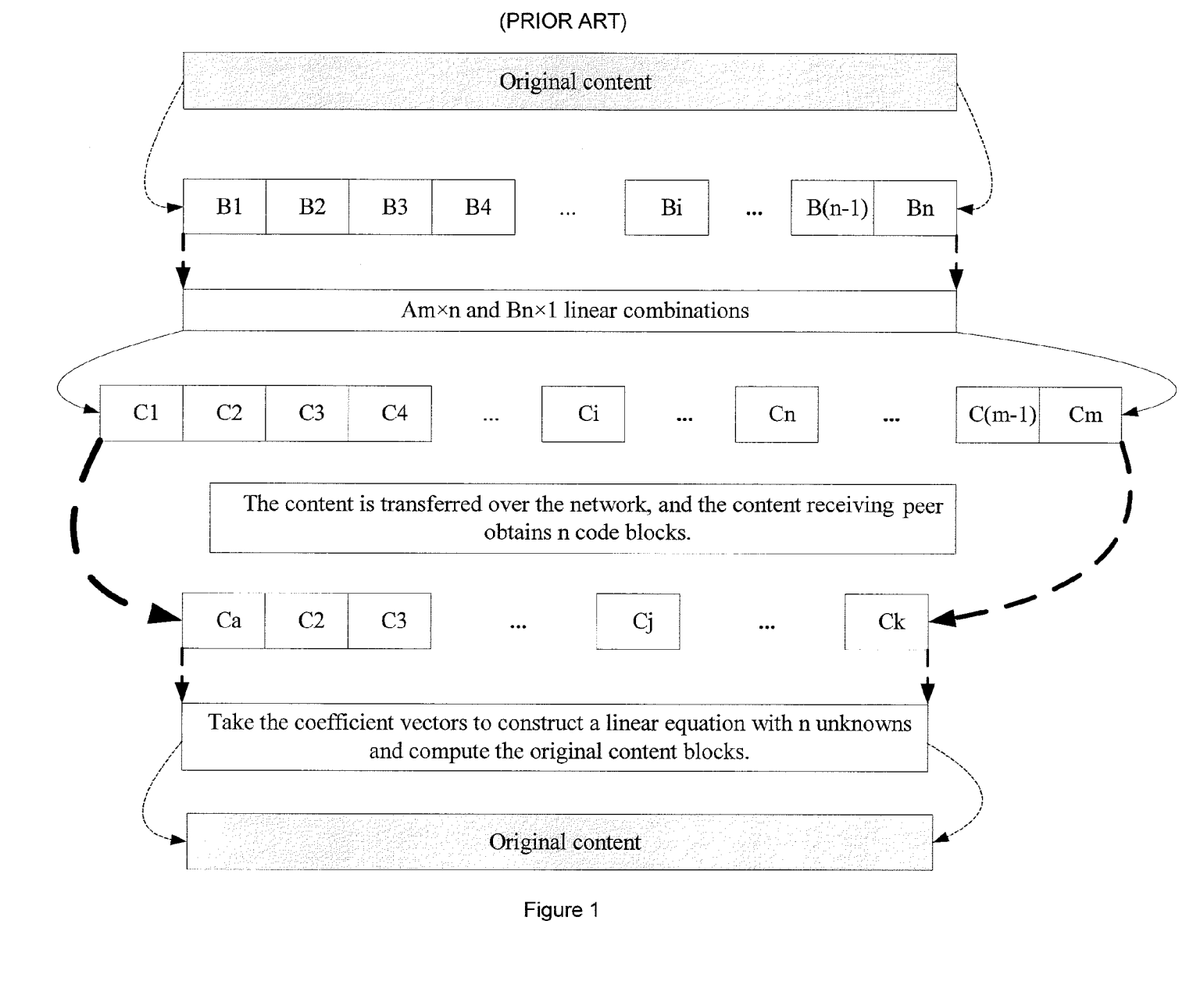
FIG. 1 shows a process of transmitting shared contents in the prior art.

Currently, the original content is divided into blocks by using the linear packet coding scheme. FIG. 1 shows the process of transmitting shared contents in the prior art. The process includes the following steps:

01. The content source peer divides the original content into n blocks according to the size of the original content. Each content block is represented as B1, B2, ..., Bn.

02. The content source peer constructs m n-dimensional coefficient vectors. m is equal to or greater than n, and any n n-dimensional coefficient vectors are of linear independence.

03. The content source peer combines the m n-dimensional coefficient vectors with n content blocks linearly to obtain m linear code blocks, namely, C1, C2, ..., Cm.

This step may be indicated by the following formula:

$$C = A \times B$$

$$= \begin{bmatrix} a_{11}, & a_{12}, & a_{13}, & \ldots, & a_{1n} \\ a_{21}, & a_{22}, & a_{23}, & \ldots, & a_{2n} \\ a_{31}, & a_{32}, & a_{33}, & \ldots, & a_{3n} \\ & & \vdots & & \\ a_{n1}, & a_{n2}, & a_{n3}, & \ldots, & a_{nn} \\ & & \vdots & & \\ a_{m1}, & a_{m2}, & a_{m3}, & \ldots, & a_{mn} \end{bmatrix} \times \begin{bmatrix} B_1 \\ B_2 \\ B_3 \\ \vdots \\ B_n \end{bmatrix}$$

$$= \begin{bmatrix} C_1 \\ C_2 \\ C_3 \\ \vdots \\ C_n \\ \vdots \\ C_m \end{bmatrix}$$

A is a coefficient matrix composed of m n-dimensional coefficient vectors. Any n n-dimensional coefficient vectors are of linear independence.

04. The content receiving peer sends a content download request that carries a content ID to the content transmitting peer.

In this step, the content transmitting peer may be the content source peer or a content terminal that has downloaded code blocks from the content source peer or other content transmitting peers.

05. After receiving the content download request, the content transmitting peer sends the stored coefficient vectors corresponding to the content ID carried in the request to the content receiving peer.

06. The content receiving peer compares the coefficient vectors received from the content transmitting peer with the downloaded coefficient vectors corresponding to the content ID.

07. The content receiving peer downloads the code blocks from the content transmitting peer according to the coefficient vectors stored by the content transmitting peer but not downloaded by the content receiving peer. Taking coefficient vector a among all coefficient vectors received from the content transmitting peer as an example, if the coefficient vectors corresponding to the content ID that are downloaded by the content receiving peer do not include coefficient vector a, the content receiving peer determines that the code block corresponding to coefficient vector a is not downloaded, and may download this code block from the content transmitting peer. A code block that the content receiving peer downloads from the content source peer includes block property and block data. The block property includes a content ID, a coefficient vector, a block size and a block checksum.

08. The content receiving peer determines that n code blocks are downloaded, and constructs a linear equation with n unknowns according to n code blocks and n n-dimensional coefficient vectors. The content receiving peer obtains n content blocks of the original content by computing this equation.

09. The content receiving peer obtains the original content according to the n content blocks. Meanwhile, the content receiving peer shares the code blocks that are downloaded from the content transmitting peer.

As seen from FIG. 1, the prior art has the following drawbacks:
1. When the content receiving peer queries the content transmitting peer for the required code blocks and downloads the code blocks from the content transmitting peer, the content transmitting peer must transfer the coefficient vectors corresponding to the code blocks to the content receiving peer. This may occupy large bandwidth resources if there are high dimensional coefficient vectors.
2. When the content receiving peer determines to download code blocks from the content transmitting peer, the content receiving peer must compare the coefficient vectors stored by the content transmitting peer with the downloaded coefficient vectors to determine what code blocks need to be downloaded from the content transmitting peer. This may take a long time when there are high dimensional coefficient vectors, thus increasing the duration of obtaining the original content and reducing the sharing speed.
3. The combination of code blocks and original content blocks looses the linear coding property. Therefore, the original content blocks cannot be shared, and the original content and code blocks must be reserved after the content receiving peer recovers the original content. This wastes huge space resources.
4. When the coefficient vectors are constructed, the coefficient vectors only need to satisfy the condition that any n n-dimensional coefficient vectors are of linear independence. Therefore, it may take the content receiving peer a long time to compute the equation when complex coefficient vectors are constructed, thus decreasing the sharing efficiency.

SUMMARY OF THE INVENTION

The present invention provides a method and system for transmitting shared contents and a content terminal to save bandwidth resources and increase the content sharing efficiency.

It should be noted that the content source peer in the present invention refers to a content terminal that performs block division and linear coding on the original content; the content transmitting peer is relative to the content receiving peer and refers to a content terminal that owns linear code blocks of the original content and provides code blocks for the content receiving peer to download; the content source peer may be the content transmitting peer; the content receiving peer is relative to the content transmitting peer and refers to a content terminal that downloads the required code blocks from the content transmitting peer.

The invention provides the following technical scheme:

A method for transmitting shared contents includes:

pre-configuring rules for constructing coefficient vectors corresponding to shared contents on a content terminal to ensure that each coefficient vector has its own coefficient vector ID;

by a content source peer, dividing original contents into blocks and constructing coefficient vectors corresponding to the original contents according to the preceding rules for constructing coefficient vectors and combining the original content blocks with the corresponding coefficient vectors linearly to obtain code blocks, where the ID of each code block is the same as the ID of the corresponding coefficient vector; and by the content receiving peer, determining to download code blocks from the content source peer, and downloading code blocks from the content source peer according to the IDs of code blocks stored by the content source peer but not stored by the content receiving peer.

A system for transmitting shared contents includes a content source peer and a content receiving peer, where:

the content source peer is adapted to divide the original content into blocks and construct coefficient vectors according to configured rules for constructing coefficient vectors; the content source peer is also adapted to combine the original content blocks and the coefficient vectors linearly to obtain code blocks, and share the code blocks, where the ID of each code block is the same as the ID of the corresponding coefficient vector; and the content receiving peer is adapted to download code blocks from the content source peer according to the IDs of the required code blocks.

A content source peer for providing shared contents includes a source peer content storage module, a source peer coefficient vector constructing module and a coding module, where:

the source peer content storage module is adapted to divide the original content into blocks, send the number of original content blocks to the coding module, and share the code blocks that the coding module stores on the content storage module;

the source peer coefficient vector constructing module is adapted to construct coefficient vectors according to configured rules for constructing coefficient vectors after receiving a request for coefficient vectors from the coding module, and send the coefficient vectors to the coding module; and the coding module is adapted to send a request for coefficient vectors to the source peer coefficient vector constructing module according to the number of original content blocks received from the source peer content storage module and the number of code blocks determined by the coding module; the coding module is also adapted to linearly combine the original content blocks invoked from the source peer content storage module with the coefficient vectors received from the source peer coefficient vector constructing module to obtain code blocks, where the ID of each code block is the same as the ID of the corresponding coefficient vector, and store the code blocks in the source peer content storage module.

A content receiving peer for downloading shared contents includes a content downloading module, a receiving peer coefficient vector constructing module, and a content recovering module, where:

the content downloading module is adapted to download code blocks from the content transmitting peer according to the IDs of required code blocks, and notify the content recovering module that the download is complete after determining that the code blocks of the current content are downloaded;

the receiving peer coefficient vector constructing module is adapted to construct coefficient vectors according to the number of original content blocks carried in the request for coefficient vectors received from the content recovering module, IDs of code blocks, and configured rules for constructing coefficient vectors, and send the coefficient vectors to the content recovering module; and the content recovering module is adapted to invoke code blocks from the content downloading module according to the indication about the completion of download received from the content downloading module, send a request for coefficient vectors to the receiving peer coefficient vector constructing module, with the request carrying the number of original content blocks and ID of each code block, construct an equation according to each code block and the coefficient vectors returned by the receiving peer coefficient vector constructing module, compute the equation to obtain each original content block, and obtain the original content according to each original content block.

As seen from the technical scheme of the present invention, rules for constructing coefficient vectors corresponding to the shared contents are pre-configured on a content terminal; the content source peer obtains each coefficient vector according to the rules so as to obtain code blocks, and the ID of each code block is the same as the ID of the corresponding coefficient vector; the content receiving peer downloads code blocks from the content transmitting peer according to the IDs of code blocks, and may construct coefficient vectors corresponding to the code blocks according to the IDs of code blocks, namely, the IDs of coefficient vectors and configured rules for constructing coefficient vectors, so as to obtain each original content block. This makes it unnecessary for the content transmitting peer to transfer coefficient vectors corresponding to the code blocks when transferring the code blocks to the content receiving peer, thus saving the transmission bandwidth. The content receiving peer determines the code blocks to be downloaded according to the IDs of code blocks only, namely, the IDs of coefficient vectors. This makes it unnecessary to determine the code blocks to be downloaded by comparing the coefficient vectors, thus saving the time and increasing the content sharing speed.

Further, the present invention constructs the first n coefficient vectors in the coefficient matrix m*n into an n*n unit matrix and the latter m-n coefficient vectors into a matrix in the Galois field (GF), and any n coefficient vectors among the m coefficient vectors in the coefficient matrix are of linear independence. This enables the content receiving peer to use the original content blocks as the shared content blocks, thus saving the space resource, reducing and even avoiding the time of computing the equation by the content receiving peer, and increasing the sharing efficiency.

DETAILED DESCRIPTION OF THE INVENTION

The present invention is hereinafter described in detail with reference to the embodiments and the accompanying drawings.

The following describes the two phases of the content sharing method provided by the present invention: constructing code blocks and downloading shared code blocks.

Figure 2:
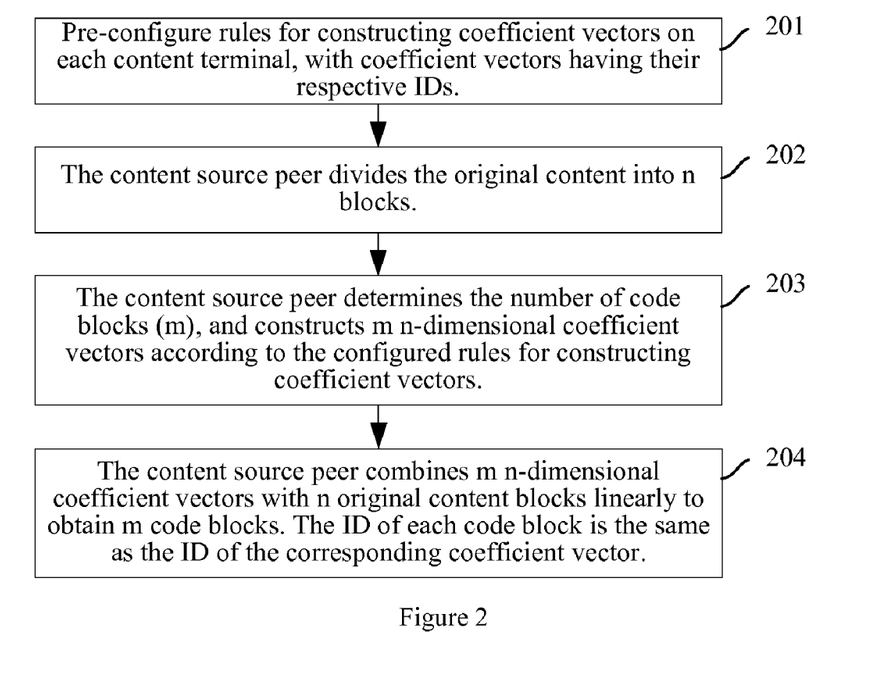
FIG. 2 shows a process of constructing shared code blocks in the present invention.

FIG. 2 shows the process of constructing shared code blocks in the present invention. As shown in FIG. 2, the process includes the following steps:

Step 201: Rules for constructing coefficient vectors in the coefficient matrixes of the shared contents is pre-configured on each content terminal, with the coefficient vectors in the coefficient matrixes having their respective IDs.

The constructed coefficient vectors only need to meet the condition that any n coefficient vectors are of linear independence, of which n is an integer greater than 1.

Step 202: The content source peer divides the original content into n blocks.

Step 203: The content source peer determines the number of code blocks (m) and constructs m n-dimensional coefficient vectors according to the configured rules for constructing coefficient vectors, where m is greater than n.

Step 204: The content source peer combines the m n-dimensional coefficient vectors with n content blocks linearly to obtain m linear code blocks, with the ID of each code block same as the ID of the corresponding coefficient vector.

Figure 3:
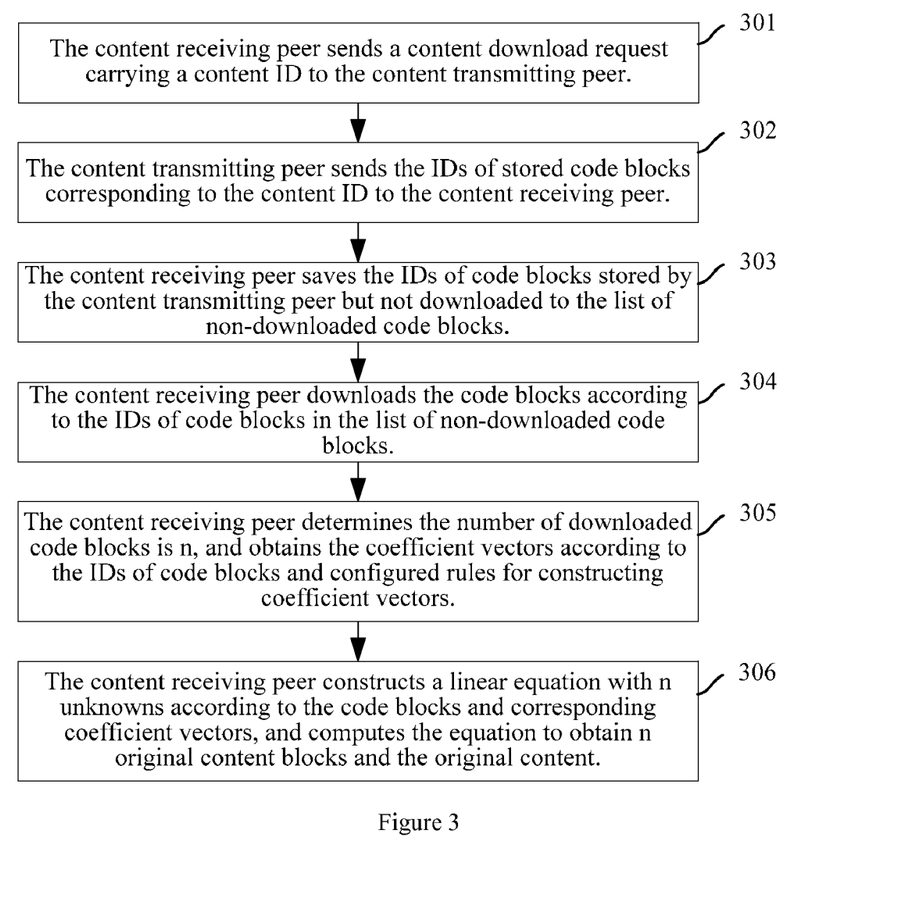
FIG. 3 shows a process of downloading shared code blocks in the present invention.

FIG. 3 shows the process of downloading shared code blocks based on FIG. 2 in the present invention. As shown in FIG. 3, the process includes the following steps:

Step 301: The content receiving peer sends a content download request to the content transmitting peer, with the request carrying the ID of the content to be downloaded.

The content transmitting peer in step 301 may be the content source peer or any content terminal that has obtained the content from the content source peer or other content terminals.

Step 302: After receiving the content download request, the content transmitting peer sends the IDs of stored code blocks corresponding to the content ID carried in the request to the content receiving peer.

Step 303: The content receiving peer compares the IDs of code blocks received from the content transmitting peer with the downloaded IDs of code blocks corresponding to the content ID, and saves the IDs of code blocks stored by the content transmitting peer but not downloaded by the content receiving peer to the list of non-downloaded code blocks corresponding to the content ID.

After determining to download code blocks of the content, the content receiving peer may establish a list of non-downloaded code blocks for the content, and save the IDs of code blocks stored by the content transmitting peer but not downloaded to the list. In addition, the content receiving peer downloads each code block from the content transmitting peer according to the list.

Step 304: The content receiving peer downloads code blocks from the content transmitting peer according to the IDs of code blocks in the list of non-downloaded code blocks.

A code block that the content receiving peer downloads from the content source peer includes block property and block data. The block property includes a content ID, a coefficient vector, a block size and a block checksum. The block size includes the number of blocks of the original content.

Step 305: The content receiving peer determines that the number of downloaded code blocks corresponding to the content ID is n, and constructs coefficient vectors for the code blocks according to IDs of the downloaded code blocks and configured rules for constructing coefficient vectors.

Step 306: The content receiving peer constructs a linear equation with n unknowns according to the n code blocks and corresponding n coefficient vectors, computes the equation to obtain each original content block, and arranges each original content block according to the location information to obtain the original content.

The property of an original content block includes the location information of the original content block in the whole original content. The content receiving peer may arrange each original content block and recover the original content according to the location information.

It is apparent that rules for constructing coefficient vectors are pre-configured on each content terminal. Therefore, in the present invention, it is unnecessary for the content transmitting peer to transfer coefficient vectors corresponding to code blocks when transferring code blocks. Instead, only the IDs of the coefficient vectors, namely, IDs of code blocks, need to be transferred to the content receiving peer, and thus the transmission bandwidth is saved. Besides, when determining the code blocks to be downloaded from the content transmitting peer, the content receiving peer only needs to compare the IDs of code blocks stored by the content transmitting peer with the IDS of code blocks downloaded by the content receiving peer. This makes it unnecessary to determine the code blocks to be downloaded by comparing the coefficient vectors, thus saving the time and increasing the content sharing speed.

In practical applications, to facilitate the content receiving peer to compute the linear equation with n unknowns and enable the original content blocks to be shared directly, the coefficient matrix is generally constructed as follows:

$$\begin{bmatrix} 1 \\ 2 \\ \vdots \\ 2^i - 1 \\ 2^i \\ 2^i + 1 \\ 2^i + 2 \\ \vdots \\ 2^{i+1} - 2 \end{bmatrix} \Rightarrow \begin{bmatrix} 1 & 0 & 0 & 0 & \cdots & 0 \\ 0 & 1 & 0 & 0 & \cdots & 0 \\ \vdots & & \ddots & & & \vdots \\ 0 & 0 & 0 & 0 & \cdots & 1 \\ 1 & 1 & 1 & & \cdots & 1 \\ 2^0 & 2^1 & 2^2 & & \cdots & 2^{2^i-2} \\ 3^0 & 3^1 & 3^2 & & \cdots & 3^{2^i-2} \\ \vdots & & \ddots & & & \vdots \\ x^0 & x^1 & x^2 & & \cdots & x^{2^i-2} \end{bmatrix}_{m \times n} \quad (1)$$

The matrix on the right is the coefficient matrix in the GF field constructed in an embodiment of the present invention. Each value in the matrix on the left is used to identify the coefficient vector of the corresponding row in the matrix on the right, which is also called ID of the coefficient vector.

In the preceding coefficient matrix, the first $2^i-1$ $2^i-1$-dimensional coefficient vectors form a unit matrix, and the $2^i$ to $2^{i+1}-2$ coefficient vectors form a Vandermonde matrix in the GF ($2^i$) field. i may be determined according to the following condition: i is equal to the minimum value of j when $n<2^j$. For example, if n=7, then i=3; if n=15, then i=4.

As shown in formula 1, if the number of original content blocks is n, the number of code blocks is m, m n-dimensional coefficient vectors (m>=n) are required, and the field is GF ($2^i$), then the m coefficient vectors are constructed as follows: the first n coefficient vectors are vectors constituting an n*n unit matrix, and the latter (m−n) coefficient vectors are freely taken from the coefficient vectors with the IDs of ($2^i$, $2^i+1$, ..., $2^{i+1}-2$) in formula 1, each of which is n-dimensional. Therefore, the coefficient in each coefficient vector should take the first n-row coefficients of the corresponding coefficient vector in formula 1.

For example, if n=7 and m=14, the coefficient matrix constructed by using formula 1 is as follows:

$$\begin{bmatrix} 1 \\ 2 \\ 3 \\ 4 \\ 5 \\ 6 \\ 7 \\ 8 \\ 9 \\ 10 \\ 11 \\ 12 \\ 13 \\ 14 \end{bmatrix} \Rightarrow \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \\ 1 & 1 & 1 & 1 & 1 & 1 & 1 \\ 1 & 2 & 4 & 3 & 6 & 7 & 5 \\ 1 & 4 & 6 & 2 & 3 & 5 & 7 \\ 1 & 3 & 5 & 4 & 7 & 2 & 6 \\ 1 & 6 & 2 & 7 & 4 & 5 & 3 \\ 1 & 7 & 3 & 2 & 5 & 6 & 4 \\ 1 & 5 & 7 & 6 & 3 & 4 & 2 \end{bmatrix}$$

The matrix on the right is the constructed coefficient matrix. Each value in the matrix on the left is the ID of the coefficient vector of the corresponding row in the matrix on the right.

Figure 4:
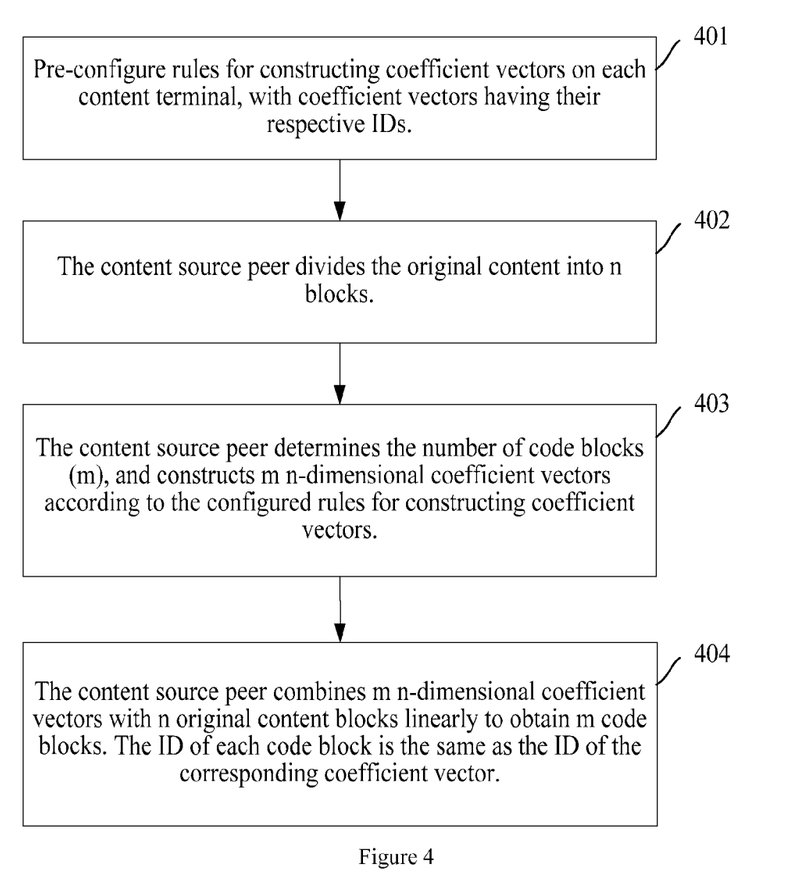
FIG. 4 shows a process of constructing shared code blocks in an embodiment of the present invention.

The following describes the process of constructing shared code blocks in an embodiment of the present invention, using the matrix in formula 1 as the coefficient matrix. As shown in FIG. 4, the process includes the following steps:

Step 401: The rules for constructing coefficient vectors in the coefficient matrix is pre-configured for shared contents on each content terminal so that a coefficient matrix may be constructed according to the number of coefficient vectors (m) and the number of dimensions of coefficient vectors (n). In the coefficient matrix, the coefficient vectors in each row have their respective IDs.

The coefficient matrix constructed in step 401 is shown in formula 1. The ID of each coefficient vector is the value in the matrix on the left.

Step 402: The content source peer divides the original content into n blocks according to the size of the original content. Each content block is indicated as B1, B2, ..., Bn.

Step 403: The content source peer determines the number of code blocks (m), constructs m n-dimensional (m>n) coefficient vectors according to the configured rules for constructing coefficient vectors, and records the ID of each coefficient vector.

Step 404: The content source peer combines the m n-dimensional coefficient vectors with n original content blocks linearly to obtain m code blocks, namely, C, C2, ..., Cm, with the ID of each code block same as the ID of the corresponding coefficient vector.

This step may be indicated by the following formula:

$$C = A \times B$$

$$= \begin{bmatrix} 1 & 0 & 0 & 0 & \cdots & 0 \\ 0 & 1 & 0 & 0 & \cdots & 0 \\ \vdots & & \ddots & & & \vdots \\ 0 & 0 & 0 & 0 & \cdots & 1 \\ 1 & 1 & 1 & 1 & \cdots & 1 \\ 2^0 & 2^1 & 2^2 & 2^3 & \cdots & 2^{n-1} \\ 3^0 & 3^1 & 3^2 & 3^3 & \cdots & 3^{n-1} \\ \vdots & & & \ddots & & \vdots \\ x^0 & x^1 & x^2 & x^3 & \cdots & x^{n-1} \end{bmatrix} \times \begin{bmatrix} B_1 \\ B_2 \\ \vdots \\ B_n \end{bmatrix}$$

$$= \begin{bmatrix} C_1 \\ C_2 \\ \vdots \\ C_n \\ C_{n+1} \\ C_{n+2} \\ C_{n+3} \\ \vdots \\ C_m \end{bmatrix}$$

As seen from the preceding formula, the first n n-dimensional coefficient vectors in the coefficient matrix A form a unit matrix. Therefore, code blocks C1, C2, ..., Cn are the same as B1, B2, ..., Bn respectively, that is, C1=B2, C2=B2, ..., Cn=Bn. In the preceding formula, x=m−n.

Figure 5:
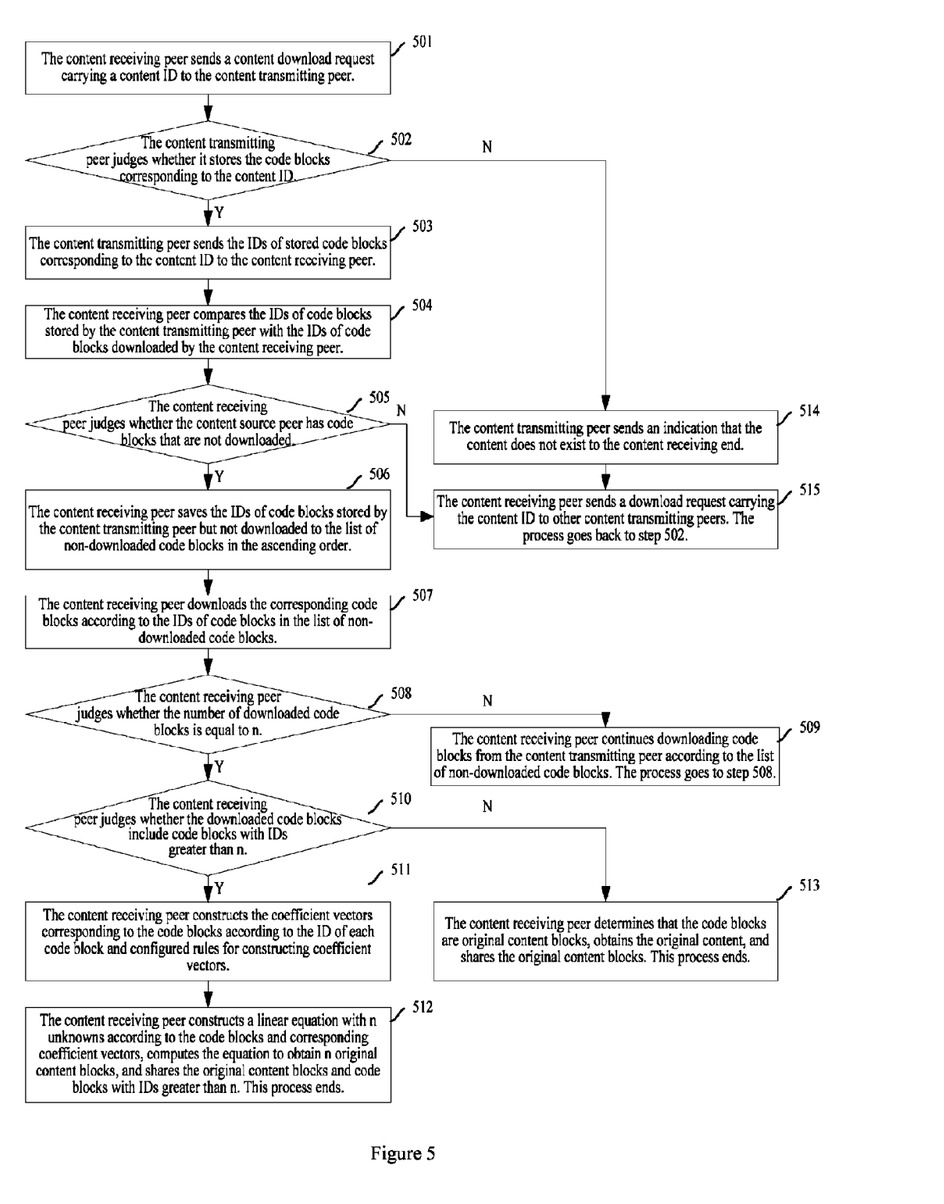
FIG. 5 shows a process of downloading shared code blocks in an embodiment of the present invention.

The following describes the process of downloading shared code blocks in an embodiment of the present invention, using the matrix in formula 1 as the coefficient matrix. As shown in FIG. 5, the process includes the following steps:

Step 501: The content receiving peer sends a content download request that carries a content ID to the content transmitting peer.

The definition of the content transmitting peer in step 501 is the same as that in step 301.

Step 502: After receiving the content download request, the content transmitting peer judges whether it stores the code blocks corresponding to the content ID. If so, step 503 is performed; otherwise, step 514 is performed.

Step 503: The content transmitting peer sends the ID of each stored code block corresponding to the content ID to the content receiving peer.

Step 504: After receiving the ID of each code block, the content receiving peer compares the ID of each received code block with the ID of each stored code block corresponding to the content ID.

Step 505: The content receiving peer judges whether the content transmitting peer has code blocks that are not downloaded. If so, step 506 is performed; otherwise, step 515 is performed.

Step 506: The content receiving peer saves the IDs of code blocks stored by the content transmitting peer but not downloaded by the content receiving peer to the list of non-downloaded code blocks corresponding to the content ID in the ascending order.

Step 507: The content receiving peer downloads code blocks from the content transmitting peer according to the IDs of code blocks in the list of non-downloaded code blocks.

Step 508: After downloading the code blocks, the content receiving peer judges whether the number of downloaded code blocks corresponding to the content ID is equal to n. If so, step 510 is performed; otherwise, step 509 is performed.

Step 509: The content receiving peer continues downloading code blocks from the content transmitting peer according to the list of non-downloaded code blocks. Then the process goes to step 508.

Step 510: The content receiving peer begins to recover the code blocks and judges whether there are IDs greater than n in the IDs of n downloaded code blocks. If so, step 511 is performed; otherwise, step 513 is performed.

Step 511: The content receiving peer determines the coefficient vector corresponding to each code block according to the ID of each code block, the number of original content blocks included in the block property and rules for constructing coefficient vectors.

Step 512: The content receiving peer constructs a linear equation with n unknowns according to the n code blocks and corresponding n coefficient vectors, computes the equation to obtain each original content block, and arranges each original content block according to the location information to obtain the original content. Meanwhile, the content receiving peer shares each original content block and code blocks with IDs greater than n. The process peers.

The code blocks with IDs equal to or smaller than n are original content blocks. Therefore, if the content receiving peer receives s code blocks with IDs equal to or smaller than n, the receiving peer only needs to compute the n-s code blocks according to the linear equation with n unknowns.

Step 513: The content receiving peer determines that the n code blocks are original content blocks, and arranges the code blocks according to the serial numbers of the code blocks to obtain the original content. Meanwhile, the content receiving peer shares each code block, namely, the original content blocks. The process peers.

Because the IDs of n code blocks are equal to or smaller than n, the n code blocks are the same as the original content blocks, making it unnecessary to construct a linear equation with n unknowns.

Step 514: The content transmitting peer returns an indication that the content does not exist to the content receiving peer.

Step 515: The content receiving peer sends a content download request that carries a content ID to other content transmitting peers. The process goes back to step 502.

It is apparent that C1, C2, ..., Cn are the same as B1, B2, ..., Bn respectively in the preceding embodiment. Therefore, for the content receiving peer, the original content blocks B1, B2, ..., Bn may be shared. Thus, the content receiving peer does not need to store B1, B2, ..., Bn and C1, C2, ..., Cn at the same time. Compared with the prior art in which the content receiving peer has to store the original content blocks and the code blocks, this greatly saves storage spaces. Meanwhile, when the code blocks that the content receiving peer downloads from the content source peer are C1, C2, ..., Cn, it is unnecessary to compute the equation, thus reducing operations, saving the operation time and increasing the sharing speed.

In practical applications, the m*n coefficient matrix is constructed as follows: the first n coefficient vectors are constructed into an n*n unit matrix; the latter (m−n) coefficient vectors are constructed into a non-Vandermonde matrix in the GF field; and any n coefficient vectors are of linear independence. The coefficient matrix constructed by using this rule is also applicable to the embodiment shown in FIG. 5.

Figure 6:
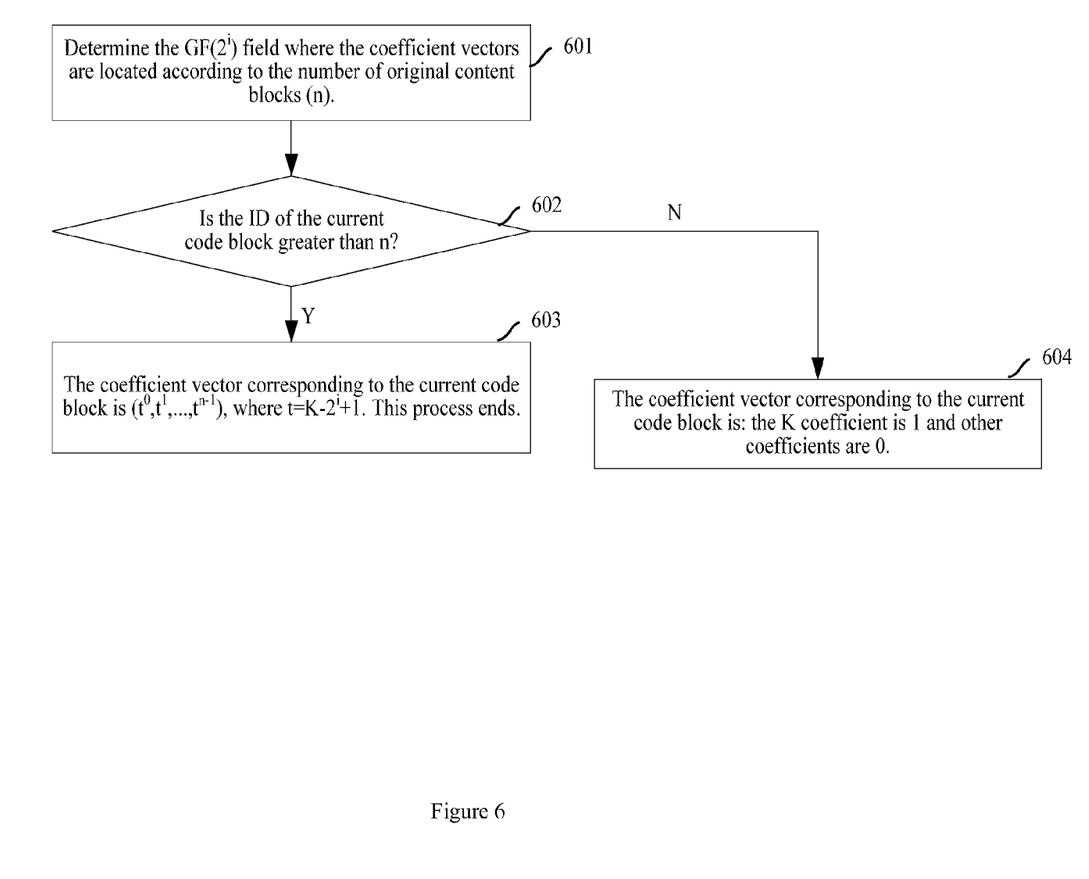
FIG. 6 shows a process of determining the coefficient vectors of code blocks by the content receiving peer in an embodiment of the present invention.

In the embodiment shown in FIG. 5, after judging that the downloaded code blocks include code blocks with IDs greater than n, the content receiving peer determines the coefficient vector of each code block according to the configured rules for constructing coefficient vectors. As shown in FIG. 6, the process includes the following steps:

Step 601: The GF ($2^i$) field where the coefficient vectors are located is determined according to the number of original content blocks (n).

Specifically, i is computed as follows: i is equal to the minimum value of j when $n<2^j$.

Step 602: It is judged whether the ID of the current code block is greater than the number of original content blocks (n). If so, step 603 is performed; otherwise, step 604 is performed.

Step 603: It is determined that the n-dimensional coefficient vectors corresponding to the current code block is ($t^0, t^1, t^2; ..., t^{n-1}$), where $t=K-2^i+1$. The process peers.

K indicates the ID of the current code block.

Step 604: It is determined that the n-dimensional coefficient vectors corresponding to the current code block are as follows: the coefficient in column K is 1 and coefficients in other columns are 0.

Figure 7:
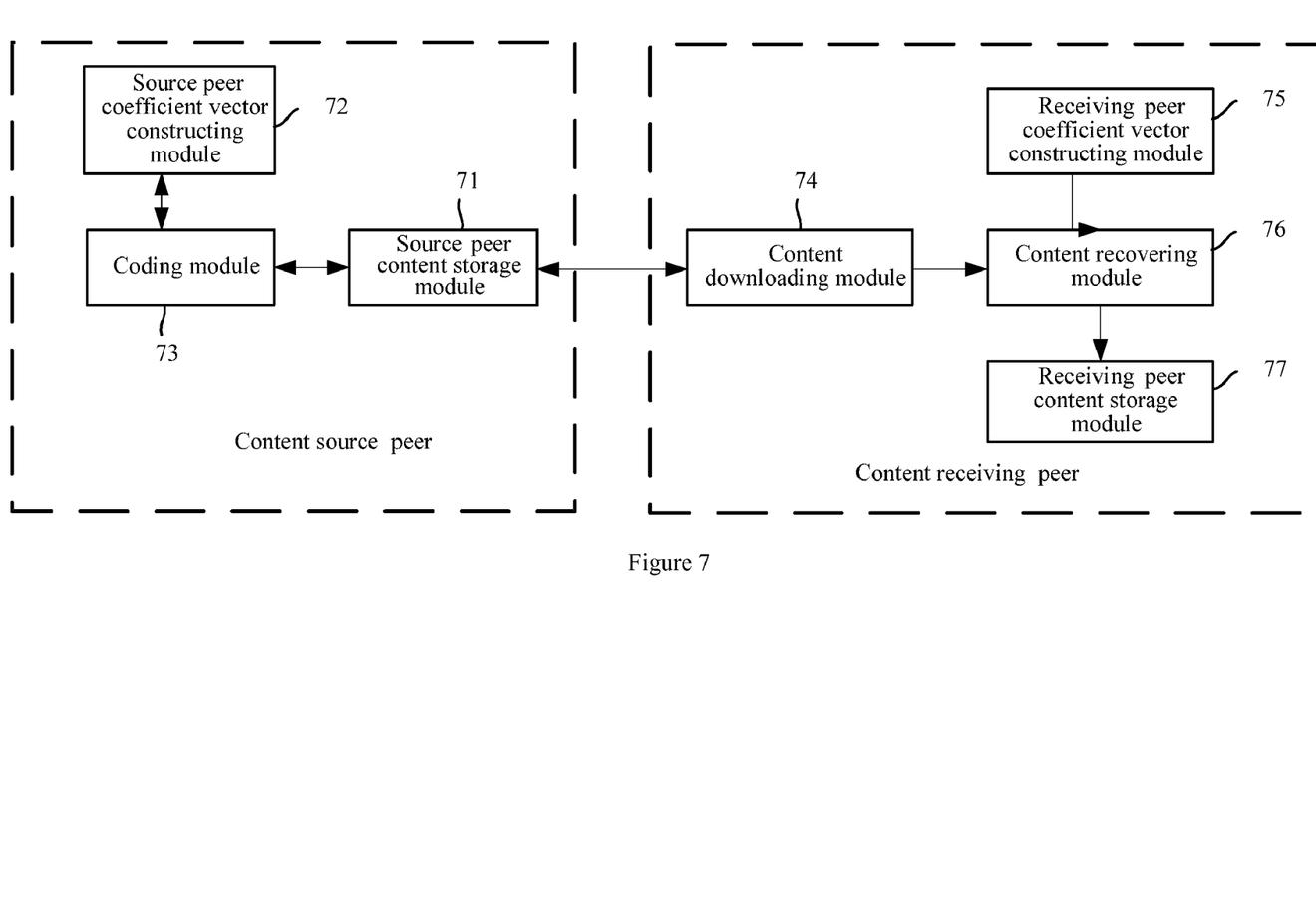
FIG. 7 shows a structure of the system for transmitting shared contents in an embodiment of the present invention.

FIG. 7 shows the system for transmitting shared contents in an embodiment of the present invention. As shown in FIG. 7, the system includes a content source peer and a content receiving peer. The content source peer includes a source peer content storage module 71, a source peer coefficient vector constructing module 72 and a coding module 73. The content receiving peer includes a content downloading module 74, a receiving peer coefficient vector constructing module 75, and a content recovering module 76. The function of each module is described as follows:

The source peer content storage module 71 is adapted to: store the original content and divide the original content into n content blocks; after receiving a content download request carrying a content ID from the content downloading module 74 of the content receiving peer, send the IDs of code blocks correspond to the content ID which are stored on the content storage module 71 by the coding module 73 to the content downloading module 74; and provide code blocks for the content downloading module 74 to download.

The source peer coefficient vector constructing module 72 is adapted to: construct m n-dimensional coefficient vectors according to the configured rules for constructing coefficient vectors upon receipt of a request for coefficient vectors that carries the number of original content blocks (n) and the number of code blocks (m); and send the m n-dimensional coefficient vectors to the coding module 73.

As shown in formula 1, the rules for constructing coefficient vectors are described as follows: the first n n-dimensional coefficient vectors form a unit matrix, and the (n+1) to m coefficient vectors in the coefficient matrix form a Vandermonde matrix in the GF ($2^i$) field. i may be obtained by using the following method: i is equal to the minimum value of j when $n<2^j$.

The coding module 73 is adapted to: determine the number of code blocks to be constructed (m) according to the original content blocks invoked from the source peer content storage module 71; send a request for coefficient vectors that carries the number of original content blocks (n) and the number of code blocks (m) to the source peer coefficient vector constructing module 72; combine the original content blocks with the coefficient vectors returned by the source peer coefficient vector constructing module 72 linearly to obtain m code blocks; and store the m code blocks in the content storage module 71.

The content downloading module 74 is adapted to: send a content download request carrying a content ID to the source peer storage module 71 of the content source peer; compare the IDs of code blocks corresponding to the content ID that are returned by the source peer content storage module 71 with the IDs of the downloaded code blocks corresponding to the content ID; save the IDs of code blocks stored by the source peer storage module but not downloaded to the list of non-downloaded code blocks corresponding to the content ID; download code blocks from the source peer storage module 71 according to the list of non-downloaded code blocks; after detecting that the number of code blocks that are downloaded and correspond to the content ID is equal to n, send an indication about the completion of download to the content recovering module 76; and provide code blocks for the content recovering module 76 and the receiving peer content storage module 77 to invoke.

When the coefficient vectors are constructed as shown in formula 1, the content downloading module 74 saves the IDs of code blocks stored by the source peer content storage module 71 but not downloaded to the list of non-downloaded code blocks in the ascending order.

The receiving peer coefficient vector constructing module 75 is adapted to: construct n n-dimensional coefficient vectors according to the configured rules for constructing coefficient vectors upon receipt of the request for coefficient vectors that carries the number of original content blocks (n) and the number of code blocks (n); and send the n n-dimensional coefficient vectors to the content recovering module 76.

The content recovering module 76 is adapted to: invoke n code blocks from the content downloading module 74 after receiving the indication about the completion of download from the content downloading module 74; send a request for coefficient vectors that carries the number of original content blocks (n) and the IDs of n code blocks to the receiving peer coefficient vector constructing module 75; construct a linear equation with n unknowns according to n n-dimensional coefficient vectors returned by the receiving peer coefficient vector constructing module 75 and n code blocks; compute the equation to obtain n original content blocks; arrange the content blocks according to the location information included in each content block to obtain the original content; and provide the original content blocks and code blocks for the receiving peer content storage module 77 to invoke.

When the coefficient vectors are constructed as shown in formula 1, the content recovering module 76 judges whether the n code blocks from the downloading module 74 include code blocks with IDs greater than n. If so, the content recovering module 76 determines that the code blocks with IDs equal to or greater than n are original content blocks; sends a request for coefficient vectors that carries the number of original content blocks (n) and serial numbers of n code blocks to the coefficient vector constructing module 75; constructs a linear equation with n unknowns according to the n n-dimensional coefficient vectors returned by the coefficient vector constructing module 75 and received n code blocks; and computes the equation to obtain the original content blocks with IDs greater than n. If not, the content recovering module 76 determines that the n code blocks are the original content blocks.

The receiving peer content storage module 77 is adapted to: share the original content blocks and/or code blocks that are invoked from the content recovering module 76; and provide the original content blocks and/or code blocks for other content terminals to download.

When the coefficient vectors are constructed as shown in formula 1, the receiving peer content storage module 77 shares the original content blocks that are invoked from the content recovering module 76 and the code blocks with IDs greater than n that are invoked from the content recovering module 76.

To describe the technical scheme of the present invention, FIG. 7 shows an embodiment of downloading code blocks from the content source peer by the content receiving peer. In practical applications, the content receiving peer may download code blocks from other content transmitting peers which are non-content source peers. In this case, the content transmitting peer may include a transmitting peer content storage module only. This module has the same function as the receiving peer content storage module 77.

The preceding embodiments are exemplary embodiments of the present invention only and not intended to limit the present invention. Any modification, equivalent substitution or improvement without departing from the spirit and principle of the present invention should be covered in the scope of protection of the present invention.

What is claimed is:

1. A method for transmitting shared contents, comprising:
by a content source peer, dividing original contents into blocks and constructing coefficient vectors corresponding to the original contents according to pre-configured rules for constructing the coefficient vectors, and combining original content blocks with the corresponding coefficient vectors linearly to obtain code blocks, wherein ID of each code block is the same as ID of the corresponding coefficient vector; and
by a content receiving peer, determining to download code blocks from the content source peer, and downloading code blocks from the content source peer according to the IDs of code blocks stored by the content source peer but not stored by the content receiving peer;
wherein the rules for constructing coefficient vectors are:
the first n coefficient vectors form an n-dimensional unit matrix, the latter m-n coefficient vectors form a matrix in the Galois field (GF), and any n coefficient vector in the m coefficient vector are of linear independence, wherein n indicates the number of orginal content blocks, m indicates the number of code blocks, and the ID of each coefficient vector indicates the row number of the coefficient vector in the coefficient martix;

and the method further comprises:

by the content receiving peer, determining the number of downloaded code block is equal to n, and judging whether there are code blocks with IDs greater than n in the n code blocks; if not, determining that the n code blocks are the n orginal content blocks, and recovering the original content according to the n orginal content blocks; if so, constructing coefficient vectors corresponding to the code blocks according to the IDs of code blocks and configured rules for constructing coefficient vectors, constructing a linear equation with n unknowns according to the code blocks and the corresponding coefficient vectors, determining that the code blocks with IDs equal to or smaller than n are original content blocks, computing the equation to obtain the original content blocks corresponding to the code blocks with IDs greater than n, and recovering the orginal content according to the n original content blocks, wherein n indicates the total number of original content blocks.

2. The method of claim 1, wherein after the content receiving peer downloads code blocks from the content source peer, the method further comprises:

by the content receiving peer, determining that the code blocks are downloaded, constructing the coefficient vectors corresponding to the code blocks according to the IDs of code blocks, the number of original content blocks included in the block properties of code blocks and configured rules for constructing coefficient vectors, constructing a linear equation according to the coefficient vectors and corresponding code blocks to obtain the original content blocks, and recovering the original content according to the original content blocks.

3. The method of claim 2, wherein after the content receiving peer recovers the original content, the method further comprises: by the content receiving peer, setting the code blocks as shared code blocks.

4. The method of claim 1, wherein the process of downloading code blocks from the content source peer according to the IDs of code blocks stored by the content source peer but not stored by the content receiving peer comprises:

by the content receiving peer, downloading code blocks with IDs smaller than n that are stored by the content source peer but not stored by the content receiving peer.

5. The method of claim 1, wherein the process for the content receiving peer to construct coefficient vectors corresponding to the code blocks comprises:

by the content receiving peer, determining the value of i in the GF $(2^i)$ field based on n, wherein i is equal to the minimum value of j when $n<2^j$, and judging whether the ID of the code block K is greater than n; if K is greater than n, judging whether the coefficient vector corresponding to the code block is $(t^0, t^1, \ldots, t^{n-1})$, wherein $t=K-2^i+1$; and if K is not greater than n, determining that the coefficient vector corresponding to the code block is as follows: the coefficient of column K is 1, and the coefficients of the n−1 columns are 0, wherein n is the total number of original content blocks.

6. The method of claim 1, wherein after the content receiving peer computes the equation to obtain n original content blocks, the method further comprises: by the content receiving peer, setting the n original content blocks and code blocks with IDs greater than n as shared code blocks.

7. The method of claim 1, wherein after the content receiving peer determines that the n code blocks are n original content blocks, the method further comprises: by the content receiving peer, sharing the content in the form of original content blocks.

8. A method for transmitting shared contents, comprising:

by a content receiving peer, determining to download code blocks from a content source peer, and downloading the code blocks from the content source peer according to IDs of code blocks that are stored by the content source peer but not stored by the content receiving peer, wherein the code blocks are obtained by the content source peer by linearly combining original content blocks with corresponding coefficient vectors that are constructed according to pre-configured rules for constructing coefficient vectors, and the ID of each code block is the same as the ID of the corresponding coefficient vector;

wherein the rules for constructing coefficient vectors are:

the first n coefficient vectors form an n-dimensional unit matrix, the latter m−n coefficient vectors form a matrix in the Galois field (GF), and any n coefficient vector in the m coefficient vector are of linear independence, wherein n indicates the number of original content blocks, m indicates the number of code blocks, and the ID of each coefficient vector indicates the row number of the coefficient vector in the coefficient martix;

and the method further comprises:

by the content receiving peer, determining the number of downloaded code block is equal to n, and judging whether there are code blocks with IDs greater than n in the n code blocks; if not, determining that the n code blocks are the n orginal content blocks, and recovering the original content according to the n orginal content blocks; if so, constructing coefficient vectors corresponding to the code blocks according to the IDs of code blocks and configured rules for constructing coefficient vectors, constructing a linear equation with n unknowns according to the code blocks and the corresponding coefficient vectors, determining that the code blocks with IDs equal to or smaller than n are the original content blocks, computing the equation to obtain the original content blocks corresponding to the code blocks with IDs greater than n, and recovering the orginal content according to the n original content blocks, wherein n indicates the total number of original content blocks.

9. A system for transmitting shared contents, applied in a peer-to-peer (P2P) network, comprising:

a content source peer, adapted to divide the original content into blocks, construct coefficient vectors according to the configured rules for constructing coefficient vectors, combine the original content blocks with the coefficient vectors linearly to obtain code blocks, and share the code blocks, wherein ID of each code block is the same as ID of the corresponding coefficient vector; and a content receiving peer, adapted to download code blocks from the content source peer according to the IDs of the required code blocks; determine the number of downloaded code blocks is equal to n, and judge whether there re code blocks with IDs greater than n in the n code blocks; if not, determine that the n code blocks are the n original content blocks, and recover the original content according to the n original content blocks; if so, construct coefficient vectors corresponding to the code blocks according to the IDs of code blocks and configured rules for constructing coefficient vectors, construct a linear equation with n unknowns according to the code blocks and the corresponding coefficient vectors, determine that the code blocks with IDs equal to or smaller than n are the original content blocks, compute the equation to obtain the original content blocks corresponding to the code blocks with IDs greater than n, and recover the original content according to the n original content blocks, wherein n indicates the total number of original content blocks;

wherein the rules for constructing coefficient vectors are:

the first n coefficient vectors form an n-dimensional unit martix, the latter m-n coefficient vectors form a matrix in the Galois field(GF), and any n coefficient vectors in the m coefficient vector are of linear independence, wherein n indicates the number of original content blocks, m indicates the number of code blocks, and the ID of each coefficient vector indicates the row number of the coefficient vector in the coefficient martix.

10. The system of claim 9, wherein after the code blocks of the current content are downloaded, the content receiving peer is further adapted to construct coefficient vectors according to the ID of each code block, the number of original content blocks in the block property of each code block and configured rules for constructing coefficient vectors, construct an equation according to each code block and coefficient vector, compute the equation to obtain each original content block, and obtain the original content according to each original content block.

11. The system of claim 10, wherein the content receiving peer is further adapted to share each original content block and/or code block.

12. A content terminal in a peer-to-peer (P2P) network, comprising:

a content downloading module, adapted to download code blocks from a content transmitting peer according to IDs of required code blocks, and notify a content recovering module that the download is complete after determining that the code blocks of the current content are downloaded;

a receiving peer coefficient vector constructing module, adapted to construct coefficient vectors according to the number of original content blocks carried in the request for coefficient vectors received from the content recovering module, IDs of code blocks, and configured rules for constructing coefficient vectors, and send the coefficient vectors to the content recovering module; and the content recovering module, adapted to invoke code blocks from the content downloading module according to the indication about the completion of download received from the content downloading module, send a request for coefficient vectors to the receiving peer coefficient vector constructing module, with the request carrying the number of original content blocks and ID of each code block, construct an equation according to each code block and the coefficient vectors returned by the receiving peer coefficient vector constructing module, compute the equation to obtain each original content block, and obtain the original content according to each original content block;

wherein the rules for constructing coefficient vectors are:

the first n coefficient vectors form an n-dimensional unit matrix, the latter m-n coefficient vectors form a matrix in the Galois field(GF), and any n coefficient vectors in the m coefficient vectors are of linear independence, wherein n indicates the number of original content blocks, m indicates the number of code blocks, and the ID of each coefficient vector indicates the row number of the coefficient vector in the coefficient matrix;

and the content recovering module is further adapted to determine the number of downloaded code blocks is equal to n, and judge whether there re code blocks with IDs greater than n in the n code blocks; if not, determine that the n code blocks are the n original content blocks, and recover the original content according to the n original content blocks; if so, construct coefficient victors corresponding to the code blocks according to the IDs of code blocks and configured rules for constructing coefficient vectors, construct a linear equation with n unknowns according to the code blocks and the corresponding coefficient vectors determine that the code blocks with IDs equal to or smaller than n are the original content blocks, computer the equation to obtain the original content blocks corresponding to the code blocks with IDs greater than n, and recover the original content according to the n original content blocks, wherein n indicates the total number of original content blocks.

13. The content terminal of claim 12, further comprising: a receiving peer content storage module, adapted to set the original content blocks and/or code blocks invoked from the content recovering module as shared content blocks and/or code blocks.

14. The content terminal of claim 12, further comprising:

a source peer content storage module, adapted to divide the original content into blocks, send the number of original content blocks to a coding module, and share the code blocks that the coding module stores on the content storage module;

a source peer coefficient vector constructing module, adapted to construct coefficient vectors according to the configured rules for constructing coefficient vectors after receiving the request for coefficient vectors from the coding module, and send the coefficient vectors to the coding module; and the coding module, adapted to send a request for coefficient vectors to the source peer coefficient vector constructing module according to the number of original content blocks received from the source peer content storage module and the determined number of code blocks, linearly combine the original content blocks invoked from the source peer content storage module with the coefficient vectors received from the source peer coefficient vector constructing module to obtain the code blocks, and store the code blocks in the source peer content storage module, wherein the ID of each code block is the same as the ID of the corresponding coefficient vector.

* * * * *